2,869,998
LIQUID FERTILIZER
Donald E. Vierling, Pittsburgh, Pa.
No Drawing. Application October 2, 1956
Serial No. 613,371
2 Claims. (Cl. 71—50)

This invention relates to compositions of matter intended to assist plant growth, and more particularly to liquid fertilizers.

It is, of course, well known that nitrogen (N), phosphorous expressed as phosphorus pentoxide ($P_2O_5$), and potassium expressed as potassium oxide ($K_2O$) are nutrients to plant life, and such have, for many years, been widely used in dry fertilizers. While these dry fertilizers have been of some value in the trade, they have not been entirely satisfactory. For example, recent surveys have shown that most users of fertilizers much prefer that it be furnished to them in liquid form, thereby eliminating any necessity for their having to make up solutions from solid particulate form with its attendant disadvantages. Further, in many cases, it is desired to introduce the fertilizer through the leaves of the plant. This, however, cannot be done properly and effectively with dry fertilizers, for they are effective generally only by root feeding.

It is, accordingly, one of the objectives of the present invention to provide an improved fertilizer in liquid form, particularly one which is completely effective for leaf feeding, as well as root feeding, pre-plow and general fertilization. The liquid fertilizers of this invention are absorbed by the plants in a tremendously increased manner, thereby practically eliminating any possibility of leaching, evaporation or any other form of loss. Therefore, to all intents and purposes, the plant is able to utilize substantially the complete value of the nutrients present in the improved liquid fertilizer of the present invention.

In preparing the liquid fertilizer of this invention, I first place in a vessel in which the fertilizer is to be made the amount of water which is to be present in the final composition. To the water is added potassium hydroxide to obtain the desired percentage of potassium oxide in the final composition. Sufficient nitric acid is introduced in the resultant mixture to obtain a pH of about 7, although the pH can vary from about 6.5 to about 7.5. Phosphoric acid is then added to obtain the desired percentage of phosphorus pentoxide in the final composition. The phosphoric acid is neutralized, preferably by bubbling ammonia through the aqueous solution. If desired, however, an aqueous ammonia solution can be added to the aqueous solution rather than by bubbling ammonia therethrough. The desired nitrogen content is then obtained (considering the nitrogen already added by the nitric acid to neutralize the potassium hydroxide, and the ammonia added to neutralize the phosphoric acid) by introducing into the solution equal molecular weights of ammonia (by bubbling it in) and nitric acid to obtain the desired percentage of nitrogen.

While the liquid fertilizer obtained at this point is an excellent one, particularly for root feeding, pre-plow and general fertilization, in the preferred embodiment, particularly for leaf feeding, as will be seen, a wetting agent is added to the liquid fertilizer. While any of the standard wetting agents, anionic as well as nonionic, will be satisfactory for purposes of this invention, provided they are not detrimental to plant life, I have found the following wetting agents to be particularly effective: Ultra-wet, Santomerse, Naconal, Oronite D–40, Triton X–100, Triethanolamine, Super wet LD, Dupanol, dodecyl benzene sodium sulfonate, lauryl alcohol, and algin. If desired, trace elements similar to the following can be added to the liquid fertilizer to supply various soil deficiencies: manganese sulphate, boric acid, copper sulphate, zinc sulphate, cobalt sulphate, iron sulphate, sodium molybdate.

The composition of matter obtained from the procedure outlined above comprises the following salts:

1. Potassium phosphate, dibasic ($K_2HPO_4$)
2. Potassium phosphate, tribasic ($K_3PO_4$)
3. Ammonium phosphate, dibasic (($NH_4)_2HPO_4$)
4. Ammonium phosphate, monobasic ($NH_4H_2PO_4$)
5. Potassium nitrate ($KNO_3$)
6. Ammonium nitrate ($NH_4NO_3$)
7. Potassium phosphate, monobasic ($KH_2PO_4$)
8. Ammonium phosphate, metabasic (($NH_4)_4P_4O_{12}$)
9. Potassium ammonium phosphate ($KNH_4HPO_4$)

the following acids:

1. Nitric acid ($HNO_3$)
2. Phosphoric acid ($H_3PO_4$)

the following bases:

1. Potassium hydroxide (KOH)
2. Ammonium hydroxide ($NH_4OH$)

and the following ions:

1. $H^+$
2. $PO_4^{---}$
3. $K^+$
4. $OH^-$
5. $NO_3^-$
6. $NH_4^+$

The amounts of the various chemicals present can acceptably vary over a wide range and depend, in part, on such variables as temperature, pressure, the desired ratio of nitrogen, phosphorus pentoxide and potassium oxide desired in the final liquid fertilizer, etc. For best results, however, I have found that nitrogen should be about one to about 30 percent by weight of the final liquid fertilizer, phosphorus pentoxide about one to about 30 percent by weight and potassium oxide about one to about 30 percent by weight. The wetting agent, when added in accordance with the preferred embodiment of the invention, should be present in an amount corresponding to at least about 0.25 percent by weight, preferably about 0.5 to about 1.0 percent by weight of the final composition.

*Illustrative specific composition*

Into a vat was placed 42½ pounds of water. While stirring, and at room temperature 72°, and atmospheric pressure, the following ingredients were added successively thereto: 10½ pounds of 90 percent aqueous potassium hydroxide; 15 pounds of 67 percent aqueous nitric acid; 15 pounds of 75 percent phosphoric acid; 5 pounds of 82 percent ammonia; and 12 pounds of 67 percent of aqueous nitric acid. The entire procedure took about fifteen minutes. The solution obtained was suitable as a liquid fertilizer in accordance with my invention.

The following chemicals (expressed as percent by weight of the final composition) were found to be present:

|    |    | Percent |
|----|----|---------|
| 1. | $K_2HPO_4$ | 11.80 |
| 2. | $K_3PO_4$ | 1.92 |
| 3. | $(NH_4)_2HPO_4$ | 1.70 |
| 4. | $NH_4H_2PO_4$ | 0.70 |
| 5. | $KNO_3$ | 0.15 |
| 6. | $NH_4NO_3$ | 20.50 |
| 7. | $KH_2PO_4$ | 0.35 |
| 8. | $(NH_4)_4P_4O_{12}$ | 0.18 |
| 9. | $KNH_4HPO_4$ | 0.10 |
| 10. | $HNO_3$ | 0.18 |
| 11. | $H_3PO_4$ | 1.15 |
| 12. | KOH | 0.10 |
| 13. | $NH_4OH$ | 0.70 |

In addition, the ions $H^+$, $PO_4^{---}$, $K^+$, $OH^-$, $NO_3^-$, and NH will be present in equilibrium with the chemicals set forth above. The above composition contained 8% by weight of nitrogen, 8% by weight of phosphorus pentoxide, and 8% by weight of potassium oxide.

As previously stated, while such a composition is excellent as a liquid fertilizer, the preferred embodiment of the present invention contemplates the addition of a relatively small amount of a wetting agent in order to assist entry of the fertilizer into the leaf of the plant being treated. It is a well-known fact that nitrogen in an aqueous solution is readily absorbed by a plant through its leaves. However, in the case of phosphorous and potassium in an aqueous solution, it is exceedingly difficult to get these nutrients into the plant through the leaves in sufficient quantities to properly feed the plant. This has been a big drawback until now in getting each of these nutrients in plant life by leaf feeding. Thus, attempts in the past in this direction have resulted in the plant getting all of the nitrogen but very insufficient amounts of phosphorous and potassium. More of the phosphorous and potassium crystallized on the plant leaves and were subsequently removed from the leaves by the natural elements of wind and moisture. This, of course, meant that the plant received an unbalanced feeding of nutrients. I have found that, when a wetting agent is added to an aqueous solution of nitrogen, phosphorous and potassium such as described above, a synergistic effect takes place; and all of the hereinbefore defined nutrients are readily absorbed by the plant through the leaves, and a completely balanced feeding of the plant results.

*Example of specific useage*

Ten tomato plants were sprayed with an aqueous solution of a liquid fertilizer described in the aforementioned illustrative composition, the same containing 10 grams of nitrogen, 10 grams of phosphorus pentoxide, and 10 grams of potassium oxide. It was found that the plants absorbed 9.4 grams of nitrogen and only 0.0082 gram of phosphorus pentoxide and 0.0015 gram of potassium oxide. One-half percent by weight of Santomerse (dodecyl benzene sodium sulfonate) was added to the same composition. In the identical procedure, the solution was sprayed on ten similar tomato plants. The plants absorbed 9.8 grams of nitrogen, 9.6 grams of phosphorus pentoxide and 9.4 grams of potassium oxide. Accordingly, substantially all of the nutrients were absorbed by the plants when the wetting agent was employed. Further tests showed that a wetting agent, such as those previously described, is absolutely necessary in order to enable the plant to absorb all of the nutrients in quantities sufficient for leaf feeding.

While the above example shows that the addition of a wetting agent makes the composition superior for leaf feeding, the composition without the wetting agent is unexcelled for root feeding, pre-plow and general fertilization, as mentioned earlier herein.

The liquid fertilizer of the present invention has been found to serve as a very effective vehicle for additional water soluble chemicals generally used in agriculture, such as weed killers, soil conditioners, sequestering agents, vitamins, penicillin, antibiotics, etc.

In hard water areas, some difficulty with the solubility of certain of the agricultural chemicals might be expected. However, I have found that, along with the wetting agent, and preferably in equal proportions therewith to obtain the aforementioned total percentages, any one of the well-known sequestering agents (for example, of the polyphosphate variety) not only improves solubility, but actually aids in improved biological activity.

This application is a continuation-in-part of my patent application Serial Number 362,943, filed June 19, 1953, and entitled "Liquid Fertilizer"; now Patent No. 2,770,540, dated November 13, 1956.

Obviously, many modifications and variations of the invention, as defined above, can be made without departing from the spirit and scope thereof, and therefore only such limitations should be imposed as are indicated in the appended claims.

I claim:

1. A substantially complete aqueous solution for assisting plant growth consisting essentially of the acids $H_3PO_4$ and $HNO_3$; the bases KOH and $NH_4OH$; and the salts $K_2HPO_4$, $K_3PO_4$, $(NH_4)_2HPO_4$, $NH_4H_2PO_4$, $KNH_4HPO_4$, $KNO_3$, $NH_4NO_3$, $KH_2PO_4$ and $(NH_4)_4P_4O_{12}$; said acids, bases and salts being present in amounts corresponding to the equilibrium ratio as established by the nitrogen, phosphorous pentoxide and potassium oxide content, whereby the resultant solution contains the ions $H^+$, $PO_4^{---}$, $K^+$, $OH^-$, $NO_3^-$ and $NH_4^+$ in equilibrium with said acids, bases and salts at a selected temperature and pressure; the nitrogen (N), phosphorous pentoxide ($P_2O_5$) and potassium oxide ($K_2O$) each being present in amounts ranging between approximately 1% and approximately 30% by weight.

2. The composition of claim 1 containing additionally a wetting agent.

References Cited in the file of this patent

UNITED STATES PATENTS

| | | |
|---|---|---|
| 2,314,091 | Jones | Mar. 16, 1943 |
| 2,350,982 | Borst | June 13, 1944 |
| 2,589,734 | Ruosch | Mar. 18, 1952 |
| 2,680,680 | Coleman | June 8, 1954 |
| 2,706,151 | Clarke et al. | Apr. 12, 1955 |
| 2,713,749 | Hult | July 26, 1955 |
| 2,760,866 | Nielsen | Aug. 28, 1956 |